(12) United States Patent
Weng

(10) Patent No.: US 7,668,757 B2
(45) Date of Patent: Feb. 23, 2010

(54) METHODS AND SYSTEM OF CONTACTING AT LEAST ONE SERVICE PROVIDER ANONYMOUSLY

(76) Inventor: Weiwen Weng, 1229 Pennyroyal Ter., Sunnyvale, CA (US) 94087

( * ) Notice: Subject to any disclaimer, the term of this patent is extended or adjusted under 35 U.S.C. 154(b) by 0 days.

(21) Appl. No.: 12/326,893

(22) Filed: Dec. 3, 2008

(65) Prior Publication Data

US 2009/0307104 A1    Dec. 10, 2009

Related U.S. Application Data

(60) Provisional application No. 61/059,808, filed on Jun. 9, 2008.

(51) Int. Cl.
*G06Q 30/00*    (2006.01)
*G06F 17/30*    (2006.01)
(52) U.S. Cl. .............................. 705/26; 705/1; 705/27; 705/80
(58) Field of Classification Search ............... 705/1, 705/26–27, 37, 80
See application file for complete search history.

(56) References Cited

U.S. PATENT DOCUMENTS

| | | | |
|---|---|---|---|
| 6,704,403 B2 * | 3/2004 | Lurie et al. ............. | 379/114.1 |
| 6,938,022 B1 | 8/2005 | Singhal | |
| 7,225,169 B1 | 5/2007 | Tresser | |
| 2001/0032170 A1 * | 10/2001 | Sheth ........................ | 705/37 |
| 2002/0035536 A1 * | 3/2002 | Gellman ................... | 705/37 |
| 2002/0111894 A1 * | 8/2002 | Stevens .................... | 705/37 |
| 2002/0126819 A1 | 9/2002 | Case et al. | |
| 2002/0147674 A1 | 10/2002 | Gillman | |
| 2006/0026089 A1 * | 2/2006 | Replanski et al. ........ | 705/37 |
| 2007/0005381 A1 * | 1/2007 | Prokushev .................. | 705/1 |

OTHER PUBLICATIONS www.froogle.google.com. Jan. 30, 2005. [recovered from Archive. org on Oct. 14, 2009].*
www.google.com/products. Apr. 20, 2007. [recovered from Archive. org on Oct. 14, 2009].*

* cited by examiner

*Primary Examiner*—Jeffrey A. Smith
*Assistant Examiner*—William J. Allen
(74) *Attorney, Agent, or Firm*—O'Connor & Company; Ryan P. O'Connor

(57) ABSTRACT

According to the invention disclosed herein, methods and systems are disclosed that proactively and anonymously reach out to potential service providers, through a virtual calling agent, to screen and select one or more service providers for the consumer. Such methods would be time-consuming to conduct manually but are automated efficiently and flexibly as described herein. These methods and systems are not limited to service providers who have pre-registered at any particular web site or directory.

20 Claims, 2 Drawing Sheets

METHODS AND SYSTEM OF CONTACTING AT LEAST ONE SERVICE PROVIDER ANONYMOUSLY

FIELD OF THE INVENTION

The present invention relates generally to the field of consumer procurement of products and services over the Internet. The invention relates more specifically to methods and systems for locating service providers for consumers.

BACKGROUND OF THE INVENTION

Current online advertisement is dominated by provider-based ads. However, provider-based ads (ads paid by the service provider) have many drawbacks. First, these ads can be distracting for non-buying users. Second, the conversion rate is usually low; many clicks occur without actual materialization of any transaction. Third, it is inefficient for consumers to search a large number of ads, hoping to find appropriate service providers and vendors. It can be time-consuming for consumers, inefficient for business marketing and further it can miss locating several viable service providers.

One possible solution is to allow consumer to list their requests and hope that providers will respond. Such known services include Craigslist.org and the like. However, these services can be problematic. In some cases, a user does not know how many (if any) suitable service providers subscribe to, or have access to, a particular service. In addition, a user may not know whether his request was, or will be, viewed by any provider. In other cases, users may need to provide a phone number and other details in order to get any quotations. Giving contact information is known to lead to many potential problems for users, such as unwanted e-mails, phone calls, and mail.

In many current web-based services, a user must provide a valid phone number to receive detailed information from the service provider. However, this typically will lead to a barrage of unwanted phone calls and e-mails from multiple providers vying for the user's business. These providers often poorly understand the user's desires and requirements, thus resulting in an unpleasant and inefficient user experience.

For example, ServiceMagic (www.servicemagic.com) is a service matching users to prescreened, customer-rated service professionals for home services, such as landscaping, remodeling, etc. Upon using the ServiceMagic services, a user "will be prompted to disclose certain information . . . this information will be sent to service professionals who will need this information to respond to you or to other persons or entities . . . " (www.servicemagic.com, May 2008). By providing this information, or by submitting a service request, a user expressly consents to being contacted by ServiceMagic and by service professionals. ServiceMagic may collect information that can identify a user, such as name and e-mail address, and further may combine the personal information received from different sources.

As another example, intended to point out shortcomings associated with the art, AgentEvaluator (www.agentevaluator.com) is an internet site that allows home buyers and sellers to compare real-estate agent professionals and brokers to help buy or sell a home. While advertised as "anonymous," the policies described therein state that personally identifiable information—such as name, e-mail address, or phone number—is necessary "to provide the personalized or enhanced service that [a user] has requested." A user is asked to enter his or her address and phone number even though the site claims that those contact details are not sent to service providers. Clearly, such methods and systems are not substantially anonymous and are not desirable from the point of view of a consumer.

As an example in the home-mortgage market, according to a March 2008 survey conducted by Harris Interactive (cited at http://zillow.mediaroom.com), it can be more important for borrowers to keep their contact information private than to find the best rates. Lenders can be too eager to sell the borrowers on a deal after they know how to find borrowers. In addition, borrowers are concerned about having their personal information sold or shared. Therefore, the need to protect consumers' identities and tip the balance of power into their favor is paramount.

Some known methods employ "reverse auctions." A reverse auction (also called procurement auction, e-auction, sourcing event, or e-sourcing) is a type of auction in which the role of the buyer and seller are reversed, with the primary objective usually to drive purchase prices downward. In an ordinary auction (also known as a forward auction), buyers compete to obtain a good or service. In a reverse auction, sellers compete to obtain business.

Web-based reverse auctions have become popular for purchasing everything from accounting services to securing raw materials. With these reverse auctions known in the art, buyers typically create a project description and post it online. Invitations are then sent out to registered vendors who can place a bid if desired. Limitations of such services include that only registered vendors will be notified or have access to such requests. Because the pre-registered vendors with any specific service or web site will typically represent a small percentage compared to open business-directory-listed vendors, suitable vendors may never become aware of such requests. Business opportunities can therefore be missed in these reverse auctions.

There remains a need in the marketplace for improved methods and systems that better empower consumers to efficiently find suitable service providers. Specifically, what are needed are methods and systems that proactively reach out to potential service providers to screen and select one or more service providers for the consumer, such methods and systems not being limited by pre-registration of service providers.

In view of serious shortcomings (to the consumer) associated with known methods, it would further be particularly advantageous for methods and systems to keep the identity of consumers private throughout the provider screening process as much as possible, until a prospective vendor satisfies screening criteria defined by the consumer and/or further negotiation requires disclosure of private contact information. It would be beneficial for any disclosure to be completely voluntary between the consumer and the vendor and not be disclosed to any third party.

SUMMARY OF THE INVENTION

The present invention addresses the aforementioned shortcomings.

In one aspect, this invention provides a method of finding at least one suitable provider of a service requested by a user, the method comprising:

(i) receiving, at a network-connected computer server, a service request submitted by a user;

(ii) generating an initial list of a plurality of service providers;

(iii) producing a message, comprising the service request, from data supplied by the user;

(iv) providing an automated system capable of contacting the service providers;

(v) contacting at least some of the plurality of service providers and communicating the message provided according to step (iii); and (vi) allowing for at least one suitable service provider to contact the user.

In some embodiments, in step (ii), at least some of the service providers are open-listed and each open listing is associated with a method of contact selected from the group consisting of telephone number, fax number, e-mail address, web address, instant message, and text message. In certain embodiments, the message in step (iii) is a voice message, the system in step (iv) is an automated telephony system, and the communicating in step (v) comprises automated telephone calls. In these embodiments, step (v) can utilize e.g. IP Telephony to transmit digitized voice data, and can use an analog-to-digital converter if necessary or desirable. However, the present invention is by no means limited to use of voice messages and automated telephony.

In step (v), at least some of the plurality of service providers can be pre-selected by the user from the initial list from step (ii). In some embodiments, the user does not make any provider pre-selections in step (v).

In some embodiments, the method further comprises registration of at least one service provider, wherein the registration causes storage of data associated with the service provider on the network-connected computer server. In some embodiments, the method further comprises registration of the user, wherein registration causes storage of data associated with the user on the network-connected computer server.

The service request can be submitted by one or more communication methods selected from the group consisting of telephone, facsimile, Internet phone, satellite phone, and radio.

A user can select provider criteria selected from the group consisting of experience, professional licensure, service timeliness, service references, language, location, compensation, and payment options.

In some embodiments, in step (vi), the contact is attempted substantially instantaneously. In some embodiments, in step (vi), the user remains anonymous until step (vi).

Generally, methods can comprise communication (such as in steps (i) and/or (vi)) by one or more means selected from the group consisting of telephone, Internet phone, facsimile, satellite phone, radio, e-mail, instant messaging, and cellular text messaging. In preferred embodiments, the network is the Internet.

Methods can further include generating an Internet-based discussion thread suitable for participation by multiple persons. In such a discussion thread, at least one of the multiple persons may be someone other than the user or a provider contained in the initial list of a plurality of service providers. An Internet-based discussion thread can be suitable for participation by multiple persons, wherein a registered provider can place a bid even if the registered provider is not contained on the initial list of a plurality of service providers. In some embodiments, the user and provider utilize the Internet-based discussion thread as a primary means of communication.

Methods can further include the step of the user selecting one or more service providers to actually provide the service. Selecting can be based, at least in part, on one or more factors selected from the group consisting of price, service scope, timing, quality, reputation, flexibility, capacity, capability, and future needs.

In some embodiments, methods further comprise prompting at least one unregistered service provider to register. Such prompting can be repeated up to a maximum number of times, which could be set, for example, to between 1-10 times, or 2-5 times, such as 3 times.

In preferred embodiments, all disclosure is voluntary between the user and the service providers, and the disclosure is not provided to any party that is not the user or the service providers. In some embodiments, the contacting can be achieved by a conference call, wherein contact information of the user is not communicated to the providers.

In another aspect of the invention, methods are provided for finding at least one suitable provider of a service requested by a user, the method comprising:

(i) receiving, at a network-connected computer server, a service request submitted by a user;

(ii) generating an initial list of a plurality of service providers, wherein at least some of the service providers are registered providers who were initially open-listed until registering with the network-connected computer server;

(iii) producing a message, comprising the service request, from data supplied by the user;

(iv) providing an automated system capable of contacting the service providers;

(v) contacting at least some of the plurality of service providers and communicating the message provided according to step (iii); and (vi) allowing for at least one suitable service provider to contact the user.

Another aspect describes and provides an e-commerce system for assisting a user to find at least one suitable service provider, the system comprising a server computer configured to exchange data with a network (such as the Internet), the server computer having a processor, an area of main memory for executing program code under the direction of the processor, a storage device for storing data and program code and a bus connecting the processor, main memory and the storage device; the code being stored in the storage device and executing in the main memory under the direction of the processor, to perform the steps of:

(i) receiving, at a network-connected computer server, a service request submitted by a user;

(ii) generating an initial list of a plurality of service providers;

(iii) producing a message, comprising the service request, from data supplied by the user;

(iv) providing an automated system capable of contacting the service providers;

(v) contacting at least some of the plurality of service providers and communicating the message provided according to step (iii); and (vi) allowing for at least one suitable service provider to contact the user.

In some systems of the invention, in step (ii), at least some of the plurality of service providers are open-listed and each open listing is associated with a method of contact selected from the group consisting of telephone number, fax number, e-mail address, web address, instant message, and text message.

In some embodiments, the message in step (iii) is a voice message, the system in step (iv) is an automated telephony system, and the communicating in step (v) comprises automated telephone calls.

Systems can further comprise performing the step of registration of at least one service provider, wherein the registration causes storage of data associated with the service provider on the network-connected computer server. Systems can further comprise performing the step of registration of the user, wherein the registration causes storage of data associated with the user on the network-connected computer server.

In system embodiments, the service request can be submitted by one or more communication methods selected from the group consisting of telephone, facsimile, Internet phone, satellite phone, and radio. In step (i) and/or step (vi), one or more means selected from the group consisting of telephone, Internet phone, facsimile, satellite phone, radio, e-mail, and cellular text messaging can be employed.

In some embodiments, the system includes an Internet-based discussion thread suitable for participation by multiple persons. In some embodiments, systems further include performing the step of prompting at least one unregistered service provider to register. Preferably, but not necessarily, all disclosure is voluntary between the user and the service providers; the disclosure is not provided to any party that is not the user or the service providers.

BRIEF DESCRIPTION OF THE DRAWINGS

Non-limiting features and aspects of the present invention can be explained in the following description taken in connection with the accompanying drawing(s).

DETAILED DESCRIPTION OF EMBODIMENTS OF THE INVENTION

Figure 1:
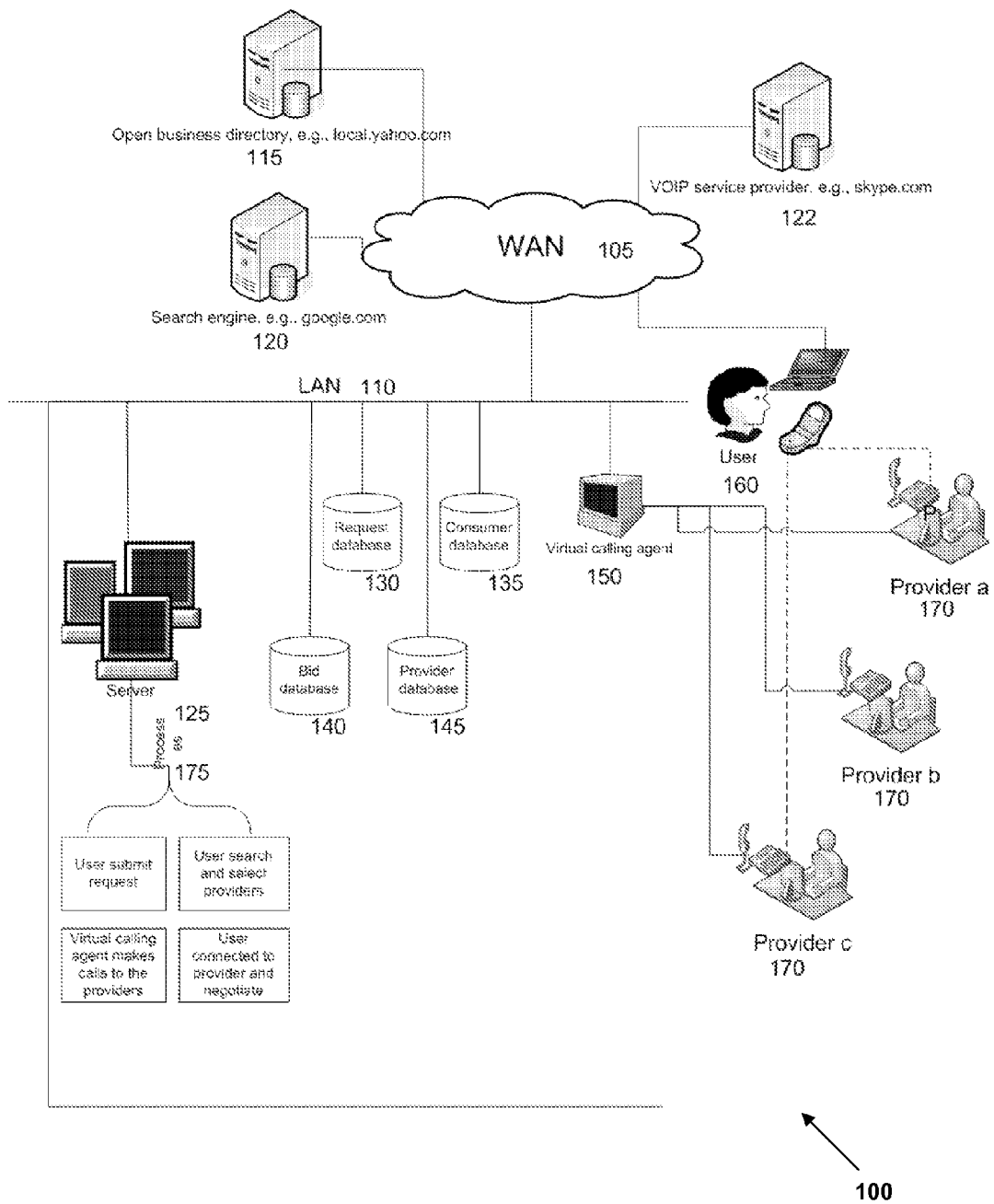
FIG. 1 shows an exemplary system embodiment of the present invention.

Some embodiments of the present invention can be described according to a computer-implemented system as follows.

A "user" as used herein means a person or persons, such as a consumer or agent for the consumer. "User" is intended to also broadly describe any person that might use a method or system of the invention, such as a person conducting research.

A "vendor," "provider," "service provider," or "business provider," or the like, are terms that are used interchangeably herein to mean a person, company, firm, agent, or other entity that can provide, or cause to be provided, one or more services or products desired by a user pursuant to a service request.

A "service request" as used herein means a request for at least one service, product, or some other form of commerce that can be sold in the marketplace.

For present purposes, "proprietary registration" means pre-registration by a service provider in a directory, or the like, which requires some action or intent by the service provider including, for example, paying a fee and/or contacting the directory with details about the serviced that can be provided. Examples of proprietary registration include, but are not limited to, listing with private business-listing companies and web sites such as www.servicemagic.com and www.realtor.com.

For present purposes, "open listing" (or "open-listed") means a record associated with a service provider, or on behalf of a service provider, in a directory, listing, book, or the like, wherein information pertaining to the service provider is substantially publicly available. Open-listed information is generally available without paying a fee directly for the information, even if collection of the information is not necessarily a routine matter.

Some embodiments of the present invention are premised on the realization, at least in part, that virtually all business open listings are associated with at least one method of contacting the business, in order for the listings to be effective for searching, advertising, and/or marketing purposes. Such methods of contacting include, but are not limited to, telephone number, e-mail address, web address, and fax number.

Examples of "open listing" include, for example, business listings in the Yellow Pages (which list e.g. telephone numbers), commerce and regulatory information, web sites such as local.yahoo.com and similar web sites, search-engine results (which list e.g. internet URL addresses), search-engine ad feeds, and so on. Other examples of open listing include vertical-domain third-party aggregators (such as, for example, www.vast.com) and classified listings. An example of a classified listing is one at craigslist.org, wherein the listing may utilize anonymous e-mail redirection as a method of contact. Anonymous e-mail redirection means that contact can be initiated with a provider without knowing the provider's actual e-mail address or any other unique contact information.

Open listing is also intended herein to include the capture of data streams associated with searches (e.g., searches using Google), by a skilled artisan in the Internet and computer-programming arts, and the extraction of information from the data, such as paid-advertisement business-provider information.

A "computer server" (or "server computer," or "server") for the purposes of the present invention includes a processor and memory. In accordance with the present invention, a server is capable of communicating on a computer network, such as the Internet. The server includes a suitable link to the network, which is itself linked to a plurality of user computers or other network devices. The server itself can be a network of individual computers or processing units.

The term "Internet" as used herein is intended to embrace generically all types of public and/or private communication networks using wireless and/or wired transmission media, and combinations of the above.

As provided and described herein, a "virtual calling agent" is a means to translate a consumer's request into an inquiry to one or more service providers in a substantially automated fashion on behalf of the consumer. The virtual calling agent can accomplish such inquiry by telephone, e-mail, fax, instant message, text message, or by some other known means of electronic communication or telecommunication.

A user can submit a service request and optionally submit certain screening criteria or conditions, as will be more fully described below. The submission of a service request is preferably performed at a web site, with data communicated via the Internet. A user can register with a computer server, either initially or after the submission of an initial request.

In some embodiments, the user can first register and/or submit a service request by telephone, facsimile (fax), Internet phone, satellite phone, radio, or any other known means of telecommunications. The user can preferably choose his or her desired means of communication.

Screening criteria or conditions imposed by a user can relate to the specific service request or to characteristics of service providers. For example, conditions could define, at least in part, the requirements of what is sought-item(s) to be bought or sold (such as a home); special features of the service; when the service needs to be conducted; and so on. These conditions could take the form of requests that are commonly known as requests for quote, requests for information, requests for proposal, and the like.

Criteria that relate more specifically to service providers could be, for example: years in the business; professional licensure; typical time to conduct or complete the service; experience with the type of service being requested; the ability to provide one or more references; language; location; rate of charges; and payment options.

As an example, a user may wish to find a real-estate agent that can speak Chinese and has prior transactions in the neighborhood, and will work at 3% or lower commission. Or a user may wish to hire a lawyer with patent-litigation experience in a certain technology, who is licensed to practice in California and will work on contingency. Other screening criteria and conditions will be contemplated by a person of ordinary skill in the art.

In preferred embodiments, the computer server receives a service request and provides an initial result to the user. This initial result can comprise a listing of one or a plurality of possible service providers that might be satisfactory to the user for the certain service request(s). In some embodiments, one or more service providers in the initial result may not match all of the screening criteria or conditions but will be directed to the appropriate category of service providers (e.g., real estate, law, etc.).

In preferred embodiments, the computer server generates the initial result by aggregating various open-listing data sources. Proprietary registration of a provider is not necessary in order to deliver a consumer's service request.

In some embodiments, service providers can register with the system of the invention, which registration may be regarded as proprietary registration with the server provided herein. In these embodiments, methods of the invention, when later conducted, can comprise a computer server generating an initial result by aggregating various data sources that include both proprietary registration and open listing, wherein the proprietary registration is associated at least with a server provided by the present invention.

In certain embodiments, methods of the invention, when conducted, can comprise a computer server generating an initial result by aggregating data sources that include primarily those associated with proprietary registration, wherein the proprietary registration is associated at least with a server provided by the present invention.

The user can select the service providers, if any, for which inquiries should be made. The computer server then generates a voice message from text entered by the user or from a direct voice recording from the user. This message preferably includes the basic service request and at least some of the screening criteria.

In some embodiments, the computer server generates an e-mail or other text message from text entered by the user or from a direct voice recording from the user. Again, this message preferably includes the basic service request and at least some of the screening criteria.

In some embodiments, the initial result is used directly by the computer server to contact one or more service providers, without any intermediate selection by the user. This mode can be beneficial when a user desires a highly automated, proactive, and comprehensive approach, notwithstanding that it might lead to relatively large numbers of calls to service providers.

The computer server utilizes (in preferred embodiments) an automated telephony system to call the selected service providers and play the service-request message. If a provider satisfies certain criteria, which relate to the screening criteria, the "virtual calling agent" (via the computer server) can then allow for the provider to be connected directly to the user by telephone, e-mail, or some other means of communication as specified by the user. In some embodiments, the connection with the user can be instantaneous, if the user so desires rapid communication.

Automated telephony can involve the use of digital technology in the provision of telephone services and systems. For example, IP Telephony is a modern form of telephony which uses the TCP/IP protocol popularized by the Internet to transmit digitized voice data. However, the present invention can implement automated telephony in standard analog systems as well. Some embodiments utilize analog-to-digital converters in making the various links involving computer servers, telephones, and human voices.

It is preferred that a user need not provide a phone number or other details in order to talk to a provider. The communication link is accomplished by the virtual calling agent on behalf of the user, in an anonymous manner. In some embodiments, all disclosure is completely voluntary between the consumer and the vendor and such disclosure is not provided to any third party, including third parties associated with the methods and systems of the present invention.

If a service provider has not registered with the computer server, the service provider can be redirected to a registration page wherein the provider will be asked to create an account. In some embodiments, the provider's information can be pre-populated by public data available, such as phone number, company address, and the like.

The computer server can be programmed with instructions to call (or otherwise inquire) an unregistered service provider up to a prescribed number of times. Unregistered providers can be asked to sign up with the server/service of the invention each time such provider is contacted. This preset limit can be, for example, in the range of 1-10 calls, preferably 2-5 calls, and more preferably 3 calls, in some embodiments. The preset limit can vary with business category and other factors, as will be appreciated. If a provider declines to register within a preset limit of inquiries, no further calls are preferably made to that service provider. Of course, exceptions can be possible.

Registration of a service provider with the server/service of the invention can take a variety of forms, and may be proprietary registration. In some variations, a plurality of service plans can be made available to service providers. Different plans can have different costs associated with them; there can be both no-cost and fee-based service plans. Upon registration, a service provider can specify preferred means of notification, which may be selected from telephone calls, e-mails, short message service (SMS) messages, really simple syndication (RSS) feeds, instant messaging, and so on. A default can be set in the absence of specific selection; e-mail is a preferable default due to its low per-transmission cost.

In some embodiments of the invention, when a service request is submitted by a user, the computer server creates a discussion thread on a web site associated with the server. A "discussion thread," or "threaded discussion," is an electronic discussion in which software aids users by visually grouping messages. Messages are usually grouped visually in a hierarchy by topic. A set of messages grouped in this way is called a "thread."

This discussion thread can be made available to multiple persons, including all users and providers, rather than only the user and providers linked to the service request. This can have practical and economic advantages for users (and providers) as will be recognized. It is, of course, even possible to make these discussion threads (or parts thereof) available publicly on the Internet.

In these discussion threads, others can enter recommendations for providers they know or with which they have experience. Additionally, registered providers can review these discussion threads and can bid for certain projects if desired (i.e., for projects in which they were not previously inquired).

In some embodiments, the user and provider can jointly choose to utilize the server-generated discussion thread as a primary means of communication, for convenience or another reason. The computer server can send reminders to users and providers to request feedback in the discussion threads.

When a prospective service provider is connected to a user, both the user and the provider are preferably free to negotiate the terms of a transaction, if any. In various embodiments of the invention, a user and provider can choose to follow up and conduct discussions privately by web-based tools, e-mail, phone, live meetings, or any other form of communication.

A specific service request may not lead to a satisfactory provider for the user; that is, the user is not forced into choosing a provider. Also, a user can ultimately make a selection not only according to the lowest price but also according to one or more of the following factors: scope of the actual service to be provided, timing, demonstrated quality, perceived quality, reputation, flexibility, capacity, overall capabilities, a desire by the user to establish a relationship for future business, or for any other reason.

A beneficial aspect of embodiments of the present invention is that it tends to lead to better deals for consumers. Preferred methods and systems can create transparency wherein multiple offers from different providers are aggregated and presented to the consumer. As an additional benefit, this transparency also can let providers know about competing offers, which can lead to more-competitive deals for consumers and can give business providers useful feedback to adjust their methods of doing business.

It will also be appreciated that methods and systems of the invention can reduce advertising and marketing costs for service providers. Sales leads can be brought directly and proactively to providers, who can then focus their efforts on real leads rather than relying on marketing strategies with relatively low probabilities of success.

Embodiments and variations of the present invention can be used by any consumer or other user (such as an agent for a consumer) interested in services and products such as, but by no means limited to, accounting, tax preparation, consulting, legal services, medical services, engineering services, intellectual-property services, patent protection, financial services, real-estate transactions, residential construction, landscaping, and other significant residential projects. Services contemplated herein also include a variety of non-trivial transactions for purchase of products such as vehicles, computer systems, office equipment, home furnishings, vacation packages, and insurance policies, to name only a few for illustrative purposes.

The present invention is particularly suitable for any consumer services and products that cannot be fully described by, e.g., product specification, model number, and a fixed price.

Example 1

Reference can be made to FIG. 1, which illustrates some embodiments of a system 100 of the invention that can be utilized by a user 160 and providers 170. A wide area network (WAN) 105 is connected to a local area network (LAN) 110. The WAN 105 is connected to an open-listed business directory 115, such as local.yahoo.com; a search engine 120, such as google.com; and a Voice over Internet Protocol (VOIP) service provider 122, such as skype.com. A server 125 is provided and connected to the LAN 110, and is capable of carrying out processes 175 comprising receiving a user request; user selecting providers; virtual calling agent making at least one call to a provider; and a user being connected to at least one provider for possible negotiations. The LAN 110 is further connected to a request database 130, a consumer database 135, a bid database 140, and a provider database 145. The virtual calling agent 150 can make calls to one or more providers 170 (illustrated as three providers in FIG. 1 as an example only) on behalf of the user 160.

Example 2

Figure 2:
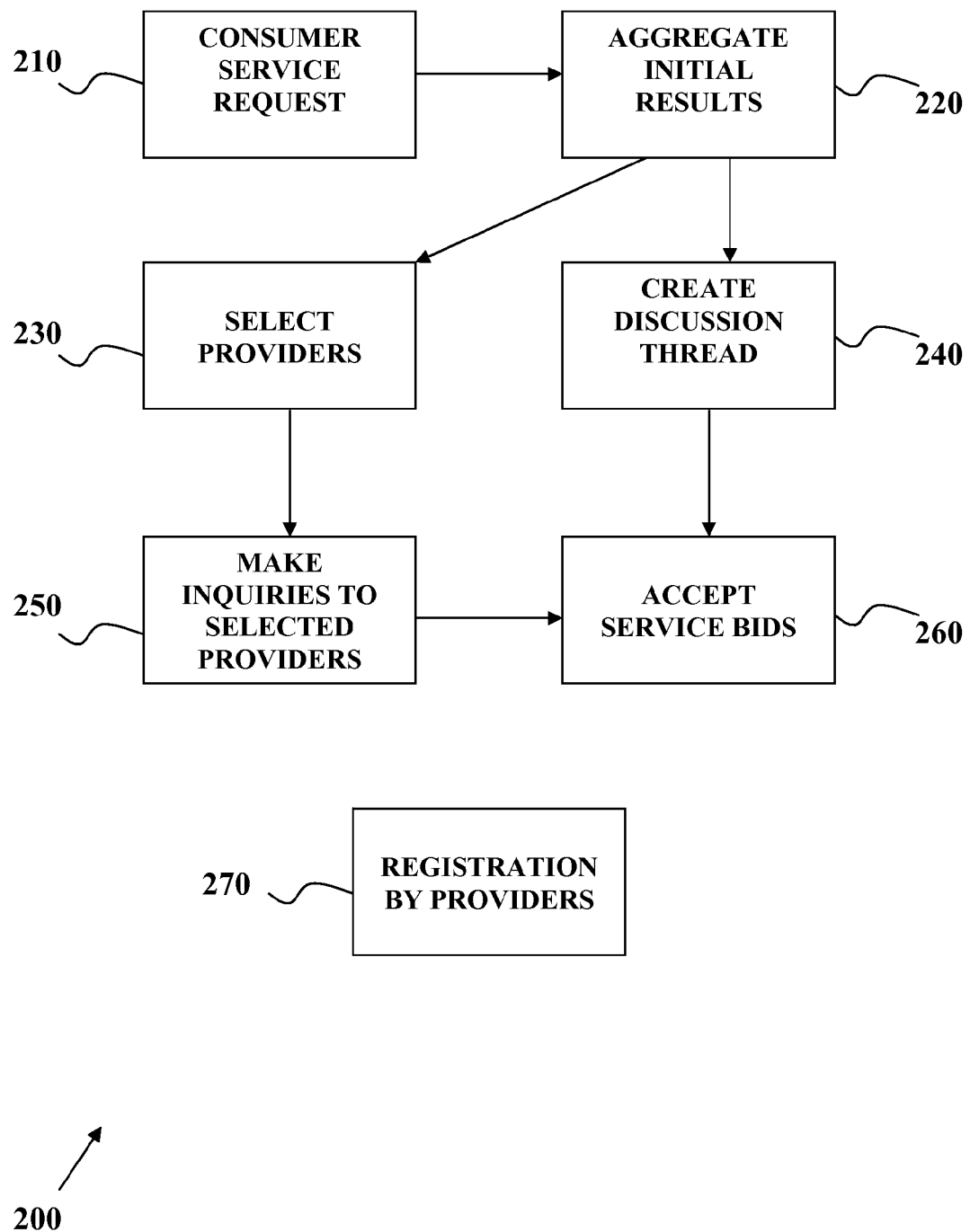
FIG. 2 shows an exemplary method embodiment of the present invention.

Reference can be made to FIG. 2, which illustrates some embodiments of a method 200 of the invention. A consumer service request 210 is received. First, initial results are aggregated 220. From these results 220, providers are selected 230 and a discussion threaded can be created 240. After providers are selected 230 according to the techniques described herein above, inquiries can be made to selected providers 250 which may include pre-registered providers. From these inquiries, one or more bids may be accepted 260 into the system. Providers can bid for the service, ask for clarification, and make an offer if desired. Also, providers can ask to be connected directly to the consumer for further discussion. The discussion thread can also lead to one or more service bids being accepted 260. From these accepted bids, one may prove to be an acceptable offer for the consumer. Optionally, one or more providers can register 270.

Although illustrative embodiments and examples, and various modifications thereof, have been described in detail herein, one skilled in the art will appreciate that the present application need not be limited to these precise embodiments and the described modifications, and that various changes and further modifications may be practiced without departing from the scope or spirit of the invention as defined in the appended claims. Other embodiments will be apparent to those of ordinary skill in the art, including embodiments that do not provide all of the features and advantages set forth herein. These other embodiments are also within the scope of this invention.

What is claimed is:

1. A method of finding at least one suitable provider of a service requested by a user, said method comprising:
   (i) receiving, at a network-connected computer server, a service request submitted by a user;
   (ii) generating, in said network-connected computer server, an initial list of a plurality of service providers, wherein at least one of said plurality of service providers is open-listed and each open listing is associated with a method of contact selected from the group consisting of telephone number, fax number, e-mail address, web address, instant message, and text message;
   (iii) producing, in said network-connected computer server, a message, comprising said service request, from data supplied by said user;
   (iv) providing an automated system capable of contacting said service providers, wherein said system is integrated with said network-connected computer server;
   (v) contacting at least two of said plurality of service providers and communicating said message provided according to step (iii), wherein, during said contacting, contact information of said user is not communicated to said providers; and
   (vi) allowing for at least one suitable service provider to contact said user;
   wherein said user remains anonymous until step (vi).

2. The method of claim 1, wherein in step (ii), at least two of said plurality of service providers are open-listed.

3. The method of claim 1, wherein said message in step (iii) is a voice message, said system in step (iv) is an automated telephony system, and said communicating in step (v) comprises automated telephone calls.

4. The method of claim 1, further comprising registration of at least one service provider, wherein said registration causes storage of data associated with said service provider on said network-connected computer server.

5. The method of claim 4, further comprising generating an Internet-based discussion thread suitable for participation by multiple persons, wherein a registered provider can place a bid even if said registered provider is not contained on said initial list of a plurality of service providers.

6. The method of claim 1, wherein said service request is submitted by one or more communication methods selected from the group consisting of telephone, facsimile, Internet phone, satellite phone, and radio.

7. The method of claim 1, wherein step (v) utilizes IP Telephony to transmit digitized voice data.

8. The method of claim 1, wherein in step (vi), said contact is attempted instantaneously.

9. The method of claim 1, comprising communication in step (i) and/or step (vi) by one or more means selected from the group consisting of telephone, Internet phone, facsimile, satellite phone, radio, e-mail, instant messaging, and cellular text messaging.

10. The method of claim 1, further comprising step (vii), said user selecting one or more service providers to actually provide said service.

11. The method of claim 1, wherein all disclosure is voluntary between said user and said service providers, and wherein said disclosure is not provided to any party that is not said user or said service providers.

12. The method of claim 1, wherein said contacting is achieved by a conference call and wherein contact information of said user is not communicated to said providers.

13. A method of finding at least one suitable provider of a service requested by a user, said method comprising:
(i) receiving, at a network-connected computer server, a service request submitted by a user;
(ii) generating, in said network-connected computer server, an initial list of a plurality of service providers;
(iii) producing, in said network-connected computer server, a message, comprising said service request, from data supplied by said user;
(iv) providing an automated system capable of contacting said service providers, wherein said system is integrated with said network-connected computer server;
(v) contacting at least two of said plurality of service providers and
communicating said message provided according to step (iii), wherein said contacting is achieved by a conference call between at least one of the at least two of said service providers and said user and wherein contact information of said user is not communicated to said providers; and
(vi) at least one suitable service provider contacting said user,
wherein said user remains anonymous until step (vi).

14. The method of claim 13, wherein said user remains anonymous during step (vi).

15. An e-commerce system for assisting a user to find at least one suitable service provider, said system comprising a server computer configured to exchange data with a network, said server computer having a processor, an area of main memory for executing program code under the direction of said processor, a storage device for storing data and program code and a bus connecting said processor, main memory and said storage device; the code being stored in said storage device and executing in said main memory under the direction of said processor, to perform the steps of:
(i) receiving, at a network-connected computer server, a service request submitted by a user;
(ii) generating an initial list of a plurality of service providers;
(iii) producing a message, comprising said service request, from data supplied by said user;
(iv) providing an automated system capable of contacting said service providers;
(v) contacting at least two of said plurality of service providers and communicating said message provided according to step (iii), wherein said contacting is achieved by a conference call between at least one of the at least two of said service providers and said user and wherein contact information of said user is not communicated to said providers; and
(vi) allowing for at least one suitable service provider to contact said user;
wherein said user remains anonymous until step (vi).

16. The system of claim 15, wherein in step (ii), at least one of said plurality of service providers is open-listed and each open listing is associated with a method of contact selected from the group consisting of telephone number, fax number, e-mail address, web address, instant message, and text message.

17. The system of claim 15, wherein said message in step (iii) is a voice message, said system in step (iv) is an automated telephony system, and said communicating in step (v) comprises automated telephone calls.

18. The system of claim 15, wherein said service request is capable of being submitted by one or more communication methods selected from the group consisting of telephone, facsimile, Internet phone, satellite phone, and radio.

19. The system of claim 15, further comprising program code to perform the step of said user selecting one or more service providers to actually provide said service.

20. The system of claim 15, further comprising program code to perform the step of prompting at least one unregistered service provider to register.

* * * * *